United States Patent [19]
Weaver

[11] 3,912,322
[45] Oct. 14, 1975

[54] ANTI-THEFT FUEL INLET COVER

[75] Inventor: Jeffrey L. Weaver, Des Plaines, Ill.

[73] Assignee: Lawrence Peska Associates, Inc., New York, N.Y. ; a part interest

[22] Filed: July 19, 1974

[21] Appl. No.: 490,068

[52] U.S. Cl. .................. 296/1 C; 70/237; 280/5 A; 292/150
[51] Int. Cl.² ........................................... B60J 9/02
[58] Field of Search .............. 296/1 C, 76; 280/5 A; 70/159, 237; 292/150; 85/8.1, 8.3, 8.9, 5 N, 5 CP

[56] References Cited
UNITED STATES PATENTS

| | | | |
|---|---|---|---|
| 2,098,185 | 11/1937 | Hannaford | 85/8.3 |
| 2,287,634 | 6/1942 | Niven | 85/8.3 |
| 2,399,119 | 4/1946 | Howell | 85/8.3 |
| 2,869,918 | 1/1959 | Kromer | 296/1 C |

FOREIGN PATENTS OR APPLICATIONS

| | | | |
|---|---|---|---|
| 523,095 | 10/1953 | France | 70/159 |
| 557,860 | 5/1958 | Canada | 85/5 CP |

*Primary Examiner*—Frank E. Werner
*Assistant Examiner*—Donald W. Underwood
*Attorney, Agent, or Firm*—Carl P. Steinhauser

[57] ABSTRACT

In vehicles having a fuel inlet covered with a license plate, or similar shield, a bracket secured to the license plate or shield holder is removably secured to an inner wall of the vehicle.

The invention relates to an anti-theft cover for a fuel inlet of a vehicle and is designed to forestall attempts to remove fuel by siphoning from a tank carried by the vehicle.

2 Claims, 3 Drawing Figures

U.S. Patent   Oct. 14, 1975   3,912,322
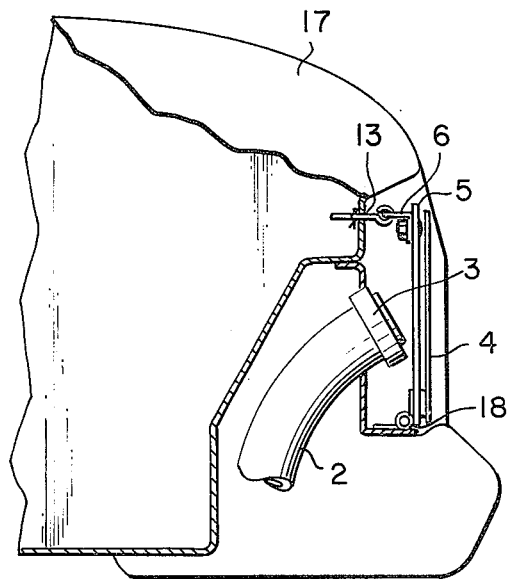
FIG.1
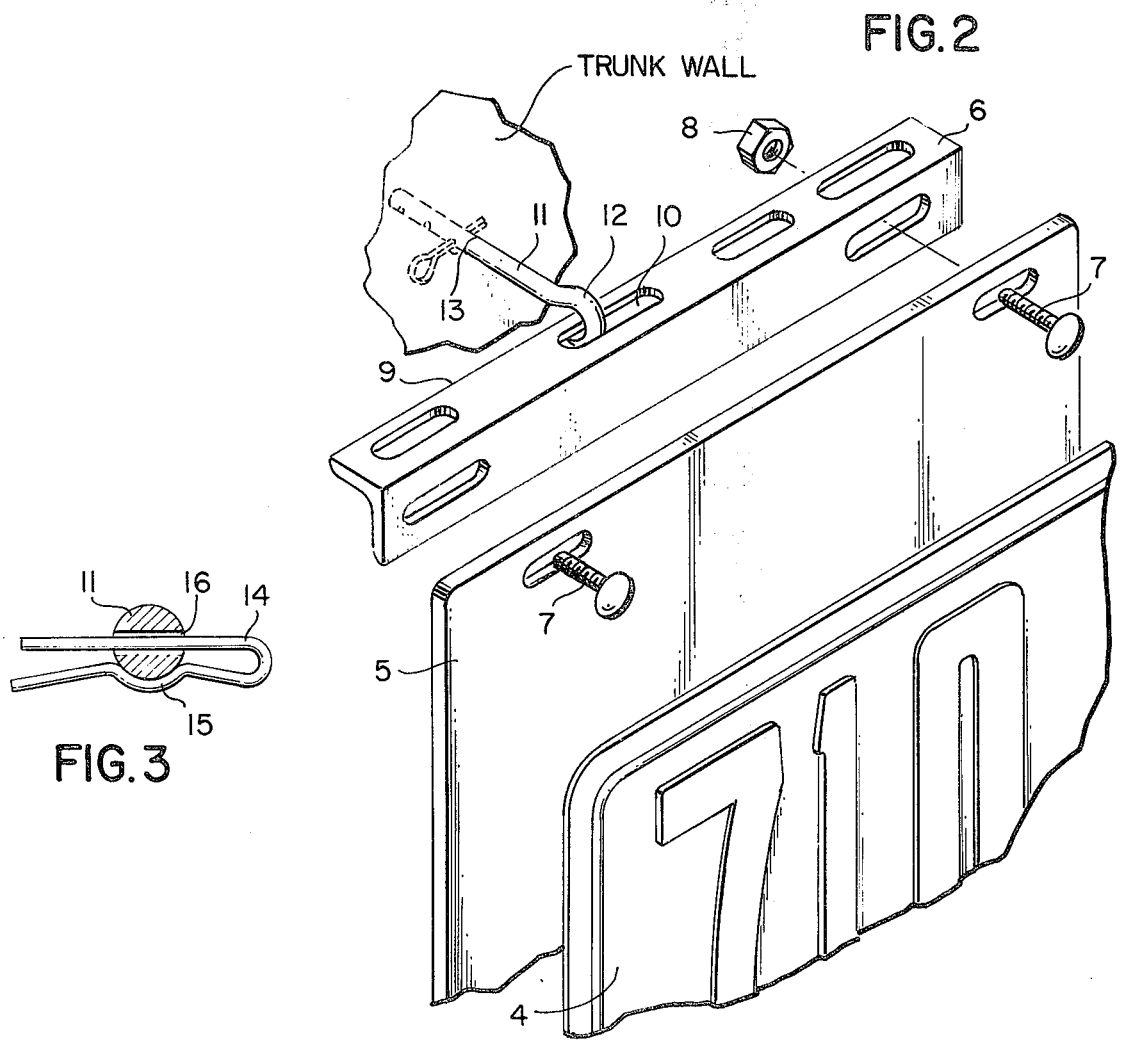
FIG.2
FIG.3

ANTI-THEFT FUEL INLET COVER

BACKGROUND OF THE INVENTION

In view of the current energy shortage, including shortages of liquid fuels used to propel vehicles, it has become increasingly important to prevent unauthorized access to a fuel storage tank used in such vehicles. Such preventive measures have included locking type caps covering the fuel inlet member which are opened either by inserting a key manually in the lock, requiring someone, usually the driver of the vehicle, to alight from the vehicle and open the lock. A more costly variation permits the lock to be opened from the passenger compartment by a control mechanism actuated by driver and mounted at, or near the instrument panel.

In either case, a separate lock and key are required which add to the cost of the vehicle, as well as increase the inconvenience of operating the vehicle. In extreme cases, the vehicle operator could not open the inlet because he has no key, and this could require destruction of the lock and the cap.

It is an object of the invention to provide a simple and inexpensive fuel anti-theft device for a vehicle, particularly one in which the fuel inlet is covered by a license plate or shield which is customary on many late model automobiles.

SUMMARY OF THE INVENTION

In accordance with the invention, a bracket or bar is provided which is secured at one end to a holder for the license plate or shield covering the fuel inlet, the other end extending through an adjacent wall of the vehicle, preferably a trunk wall, and being secured therein by a removable pin.

The invention will be described in greater detail with reference to the accompanying drawing in which:

FIG. 1 is a side view partially in section of the rear portion of a vehicle with the anti-theft fuel inlet cover according to the invention;

FIG. 2 shows an exploded view of the anti-theft fuel inlet cover;

FIG. 3 shows the locking pin.

For illustrative purposes the invention will be described in connection with an automobile having a gasoline tank mounted beneath the rear trunk, or storage space, and a fuel inlet tube 2 with a threaded cover 3 fitting over the end thereof with a license plate mounted on a hinged frame 5 covering the latter.

In order to secure the inlet cover from removal except during a fueling operation, an angle bracket 6 is secured to the license plate holder frame 5 by two bolts 7 which are removably secured to the holder by nuts 8. The unsecured side 9 of the angle bracket is provided with slots 10 in which a rod 11 having a curved end 12 fits. The other end of the rod extends through an aperture 13 in the wall of the trunk. A pin 14 having a spring clip 15 extends through a base 16 in the rod. To open the gas tank cover 3, the trunk cover is opened, manually or by a pneumatic release mechanism if the vehicle is so provided. This allows pin 14 to be removed from rod 11 permitting the license plate 4 and holder 5 to be pivoted about its hinge 18 exposing the gas tank cover.

Having thus described the invention, what is claimed as new is:

1. In combination, a vehicle having a body defining a passenger compartment and a luggage compartment, a cover for said luggage compartment pivotably connected to said body to permit access to said luggage compartment, a fuel storage container secured to and positioned beneath said body in proximity to said luggage compartment, a fuel inlet tube connecting said fuel storage container to a fuel inlet positioned in an exterior wall of said body adjacent to said cover, a cover for said fuel inlet tube, a shield member, a support member for said shield member pivotably secured to said exterior wall for covering said fuel inlet cover, said support member being pivotable away from said exterior wall to expose said fuel inlet cover, a slotted bracket member secured to said support member, a rod-like member extending through said exterior wall into said luggage compartment, said rod-like member having a curved end portion external to the wall which is adapted to fit into a slot in the bracket, said rod-like member having a shank portion which extends within said luggage compartment, said shank portion having an aperture therein, and a removable pin extending through said aperture for securing said rod member in place to prevent rotation of said shield member until the cover is opened and said pin removed from said aperture.

2. An anti-theft fuel inlet cover for a vehicle as claimed in claim 1 in which the removable pin has a flexible portion which engages said pin rod-like member securing said in said aperture in the rod-like member.

* * * * *